Patented Apr. 3, 1951

2,547,713

UNITED STATES PATENT OFFICE 2,547,713

FURANE AMIDO KETONE COMPOUNDS

Loren M. Long, Grosse Pointe Woods, and Nickolas D. Jenesel, Detroit, Mich., assignors to Parke, Davis & Company, Detroit, Mich., a corporation of Michigan No Drawing. Application March 9, 1950,
Serial No. 148,754

7 Claims. (Cl. 260—345)

1

This application is a continuation in part of our co-pending application, Serial No. 83,769, filed March 26, 1949, and the invention relates to certain new amido ketones and to methods for obtaining the same. More particularly, the invention relates to amido ketones of the furane series having the formula,

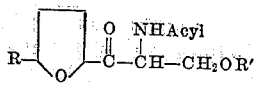

where R is hydrogen, nitro, halogen, or a lower alkyl radical, and R' is hydrogen or an acyl radical. The term "acyl" as used herein includes saturated and unsaturated lower aliphatic acyl, halogen-substituted lower alipatic acyl, carboxy-substituted lower aliphatic acyl, cyano-substituted lower aliphatic acyl, ether- substituted lower aliphatic acyl, ester-substituted lower aliphatic acyl, benzoyl, substituted benzoyl, araliphatic acyl, furoyl, pyridinoyl and the like radicals.

Our process for obtaining the compounds of the invention may be diagrammatically illustrated as follows,

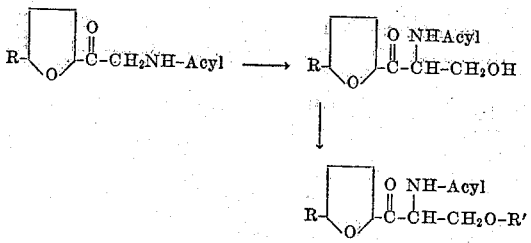

where R, R' and Acyl have the same significance as given above.

The first step of our process comprises condensing a 2-furyl acylamidomethyl ketone with formaldehyde in the presence of an alkaline condensation catalyst to obtain the corresponding 2-furyl-$\alpha$-acylamido-$\beta$-hydroxyethyl ketone. In carrying out this condensation the formaldehyde may be supplied to the reaction mixture in a number of different forms. For example, formaldehyde gas, aqueous or alcoholic solutions of formaldehyde, paraformaldehyde and other formaldehyde-yielding polymers may be used. In most cases it has been found preferable to use an excess of formaldehyde, usually up to about 4 or 5 mols, in order to insure completeness of the condensation reaction. A variety of solvents, alkaline condensation catalysts and reaction conditions may also be employed. As solvents, either aqueous or anhydrous lower aliphatic alcohols are

2 particularly advantageous but moist dialkyl ethers and dioxane-water mixtures may also be used. The alkaline condensation catalyst used in this phase of the invention may be organic bases, inorganic bases or inorganic salts of acidic or pseudo-acidic organic compounds. Some representative types of these catalysts are the hydroxides, oxides, carbonates, bicarbonates and amides of alkali or alkaline earth metals; alkali metal alkoxides; alkaline earth alkoxides; alkali metal phenolates; alkali metal salts of lower aliphatic carboxylic acids; organic tertiary amines and quaternary ammonium hydroxides of organic tertiary amines. In general, the weakly alkaline catalysts such as sodium bicarbonate, potassium bicarbonate, calcium hydroxide, pyridine, triethylamine, N-ethylmorpholine, N,N-dimethylaniline and the like are preferred since they make the reaction much easier to control. When strongly alkaline catalysts such as sodium hydroxide, potassium hydroxide, potassium carbonate, sodium methylate, sodium ethylate and the like are used, care must be taken to remove or inactivate the catalyst as soon as the reaction is completed in order to prevent the conversion of the desired product to the corresponding methylene bis compound by a dehydration and coupling reaction. Although the amount of catalyst is not critical and can vary from a few hundredths or thousandths of a mol to 1 mol or more, it is preferable from the standpoint of yields to use only enough to bring about a relatively rapid reaction. In most cases 0.05 mol or less is sufficient.

The temperature used in carrying out this methylolation reaction as well as the time required for its completion varies with the catalyst used. In general, the reaction can be carried out at a temperature between about 0 and 75° C. in a time varying from a few minutes to several hours. When strongly alkaline catalysts are used, the reaction proceeds very rapidly and is usually complete in a few minutes at room temperature or below. However, when mildly alkaline catalysts are employed, the reaction is not so rapid and usually requires from about fifteen minutes to several hours at room temperature of slightly above, that is, at about 25-50° C.

The conversion of the 2-furyl-$\alpha$-acylamido-$\beta$-hydroxyethyl ketone compounds to the corresponding $\beta$-acyloxy derivatives shown by the second step in the above diagram can be effected by treating the $\beta$-hydroxy ketone compound with an acyl halide or acyl anhydride under substantially anhydrous conditions either alone or in the presence of an acylation catalyst such as an inorganic base, an alkaline salt of an organic acid, an organic tertiary base, an aromatic sulfonic acid or sulfuric acid. The acylation can, in general, be carried out at a temperature varying from about 10 to 140° C. but the preferred temperature for the reaction is between about 60 and 120° C. An inert organic solvent such as benzene, petroleum ether, toluene and the like can be used for the reaction, if desired, although in most instances it is preferable merely to use an excess of the acylating agent. Some of the catalysts which can be used to bring about the reaction in a shorter period of time are sodium hydroxide, potassium hydroxide, potassium carbonate, sodium acetate, pyridine, quinoline, triethylamine, N-ethylmorpholine, N-ethylpiperidine, N,N-dimethylaniline, p-toluenesulfonic acid and sulfuric acid.

The products of the invention are useful in the preparation of other organic compounds. They are of particular value in the preparation of organic compounds possessing antibiotic activity against microorganisms of the Rickettsia type.

The practice of our invention is illustrated by the following examples.

Example 1

A mixture consisting of 40 g. of 2-furyl acetamidomethyl ketone, 80 cc. of 40% formalin, 2 g. of sodium bicarbonate and 350 cc. of methanol is warmed at 45° C. for one-half hour. The reaction mixture is allowed to stand for one hour and then poured into 2 liters of ice water. The precipitated product is collected, washed with water and purified by recrystallization from ethyl acetate or ethanol to obtain the pure 2-furyl α-acetamido-β-hydroxyethyl ketone of formula,

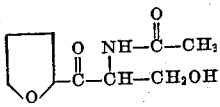

Example 2

12 g. of 2-furyl α-acetamido-β-hydroxyethyl ketone is added to 20 cc. of acetic anhydride and 0.1 cc. of concentrated sulfuric acid added to the mixture. The reaction mixture is heated at 60° C. for one-half hour, cooled and evaporated to dryness in vacuo. The residue is treated with water, the insoluble 2-furyl α-acetamido-β-acetoxyethyl ketone collected, washed with a small amount of water and dried. The formula of this product is,

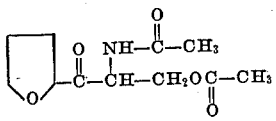

Example 3

73 g. of 2-furyl dichloroacetamidomethyl ketone is dissolved in 350 ml. of methanol and 100 ml. of 40% formalin and 3.5 g. of sodium bicarbonate is added to the resulting solution. After stirring for one and one-half hours at room temperature, the solution deposits crystals of the desired product. The 2-furyl α-dichloroacetamido-β-hydroxyethyl ketone is recrystallized from ethyl acetate. This compound has the formula,

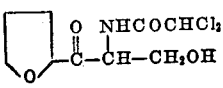

Example 4

A mixture consisting of 22.5 g. of 5-iodo-2-furyl benzamidomethyl ketone, 1 g. of sodium bicarbonate and 6 g. of paraformaldehyde in 300 cc. of methanol is warmed at 45° C. for one-half hour. The reaction mixture is allowed to stand at room temperature for about one hour and then poured into about one and one-half liters of ice water. The precipitated product is collected, washed with water and purified by recrystallization from ethyl acetate to obtain the pure 5-iodo-2-furyl α-benzamido-β-hydroxyethyl ketone of formula,

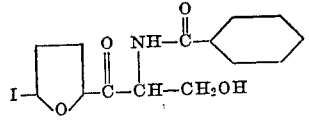

Example 5

20 g. of 5-chloro-2-furyl crotonamidomethyl ketone is dissolved in a solution of 200 ml. of methanol and 35 ml. of 40% formalin. After the addition of 1 g. of sodium bicarbonate, the solution is stirred at room temperature for one and one-half hours. The solution is evaporated to about 100 ml. whereupon some solid separates. Dilution of the resulting solution with water effects the precipitation of 5-chloro-2-furyl-α-crotonamido-β-hydroxyethyl ketone, which is collected, washed free of formalin with water, and recrystallized from aqueous dioxane. This compound has the formula,

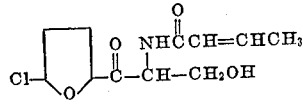

Example 6 a. 20 g. of 5-bromo-2-furyl nicotinamidomethyl ketone, 35 ml. of 40% formalin, 1 g. of sodium bicarbonate and 200 ml. of methanol are stirred together for one and one-half hours at room temperature. The 5-bromo-2-furyl-α-nicotinamido-β-hydroxyethyl ketone is collected by filtration and washed free of formalin with cold water. After drying, this material, is recrystallized from ethyl acetate. This compound has the formula,

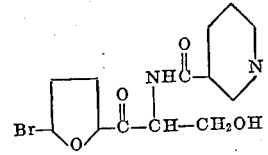

b. 12 g. of 5-bromo-2-furyl α-nicotinamido-β-hydroxyethyl ketone is added to 30 ml. of acetic anhydride, and 0.1 ml. of concentrated sulfuric acid is added to the mixture. The mixture is heated at 50° C. for one and one-half hours, then evaporated to dryness in vacuo. Treatment of the residue with water leaves an insoluble residue which, after two recrystallizations from ethyl acetate, is found to be 5-bromo-2-furyl α-nicotinamido-β-acetoxyethyl ketone which has the formula,

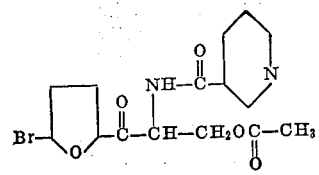

Example 7

103 g. of 5-nitro-2-furyl dichloroacetamidomethyl ketone is dissolved in 400 ml. of methanol containing 125 ml. of 40% formalin and 4.0 g. of sodium bicarbonate. The resulting solution deposits, during stirring for 70 minutes, a solid which, after recrystallization from aqueous ethanol, is found to be 5-nitro-2-furyl α-dichloroacetamido-β-hydroxyethyl ketone. The formula of this compound is,

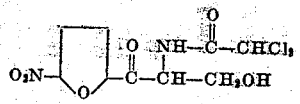

Example 8

100 g. of 5-nitro-2-furyl acetaminomethyl ketone is mixed with 500 cc. of methanol and 150 cc. of 40% formalin. 5 g. of sodium bicarbonate is added and the mixture stirred at room temperature for about one hour. During this time the desired solid product separates. The product is collected and purified by recrystallization from ethyl acetate. The material thus obtained is 5-nitro-2-furyl α-acetamido-β-hydroxyethyl ketone which has the following formula,

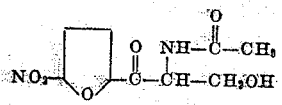

Example 9

30 g. of 5-nitro-2-furyl α-dichloroacetamido-β-hydroxyethyl ketone, 70 ml. of acetic anhydride, and 0.2 ml. of concentrated sulfuric acid are heated at 60° C. for 30 minutes. Addition of water to the solution and recrystallization of the precipitate from aqueous ethanol yields 5-nitro-2-furyl-α-dichloroacetamido-β-acetoxyethyl ketone which has the formula,

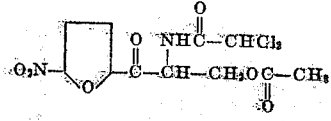

Example 10

A mixture consisting of 52.5 g. of 5-methyl-2-furyl phenylacetamido ketone, 2 g. of sodium bicarbonate and 80 cc. of 40% formalin in 350 cc. of methanol is warmed at 45° C. for one-half hour. The reaction mixture is allowed to stand at room temperature for about one hour and then poured into 3 liters of ice water. The precipitated product is collected, washed with water and purified by recrystallization from ethyl acetate to obtain the pure 5-methyl-2-furyl α-phenylacetamido-β-hydroxyethyl ketone of formula,

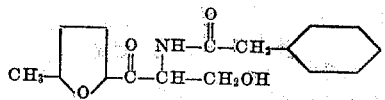

Example 11 a. A mixture of 153 g. of 5-methyl-2-furyl acetoxyacetamidomethyl ketone, 900 ml. of methanol, 140 ml. of 40% formalin, and 5 g. of sodium bicarbonate is stirred for 2 hours at room temperature. The desired 5-methyl-2-furyl α-acetoxyacetamido-β-hydroxyethyl ketone which separates is collected, washed with cold water, and recrystallized from aqueous alcohol. The formula of this compound is,

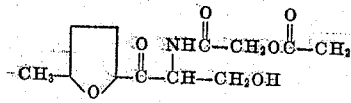

b. 23 g. of 5-methyl-2-furyl α-acetoxyacetamido-β-hydroxyethyl ketone in 100 ml. of pyridine is treated with 40 ml. of benzoyl chloride. Concentration of the solution in vacuo gives an oil which solidifies on addition of water. The solid is collected, washed with water, and recrystallized from ethyl acetate. The desired 5-methyl-2-furyl α-acetoxyacetamido-β-benzoxyethyl ketone has the formula,

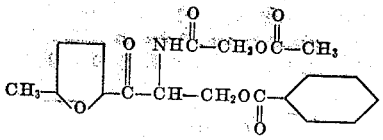

Example 12

30 g. of 5-methyl-2-furyl 2'-furamidomethyl ketone, 150 ml. of methyl alcohol, 30 ml. of 40% formalin, and 1 g. of sodium bicarbonate are stirred together for one hour at room temperature. Addition of water to the solution effects precipitation of the desired 5-methyl-2-furyl α-2'-furamido-β-hydroxyethyl ketone which is collected and recrystallized from aqueous ethanol. The formula for this material is,

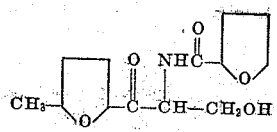

Example 13

4 g. of 5-methyl-2-furyl methoxyacetamidomethyl ketone is dissolved in a mixture of 50 ml. of methanol, 10 ml. of 40% formalin and 0.1 g. of sodium bicarbonate and stirred at room temperature for 30 minutes. Dilution of the solution with water causes precipitation of the desired 5-methyl-2-furyl α-methoxyacetamido-β-hydroxyethyl ketone which can be recrystallized from aqueous dioxane. This compound has the formula,

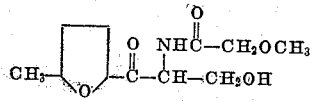

Example 14 a. 43.1 g. of 5-ethyl-2-furyl bromacetamidomethyl ketone in 155 ml. of methanol is treated with 55 ml. of 40% formalin and 2 g. of sodium bicarbonate. After stirring for one hour at room temperature, the solution is poured into water whereupon the desired 5-ethyl-2-furyl α-bromacetamido-β-hydroxyethyl ketone separates as an oil. This compound has the formula,

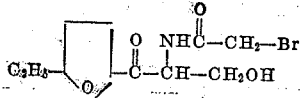

b. 40 g. of 5-ethyl-2-furyl α-bromacetamido-β-hydroxyethyl ketone in 150 ml. of pyridine is treated with 47 g. of p-toluyl chloride at 40–50° C. for one and one-half hours. Upon dilution of the solution with 3 volumes of water, the desired 5-ethyl-2-furyl α-bromacetamido-β-p-toluyloxyethyl ketone separates and is recrystallized from ethyl acetate. This compound has the formula,

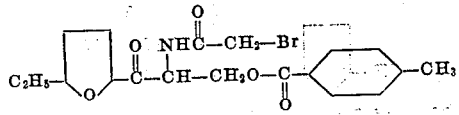

*Example 15*

173 g. of 5-ethyl-2-furyl phenylacetamidomethyle ketone is stirred for one hour with a mixture of 700 ml. of methanol, 200 ml. of 40% formalin and 10 g. of sodium bicarbonate. Evaporation of the solution to an approximate volume of 200 ml. and treatment thereof with 2 volumes of hot water effects separation of the desired 5-ethyl-2-furyl α-phenylacetamido-β-hydroxyethyl ketone as the hot solution is allowed to cool. This compound has the formula,

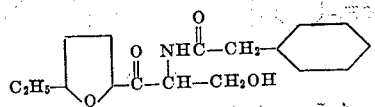

*Example 16*

100 g. of 5-ethyl-2-furyl succinamidomethyl ketone in 350 ml. of methanol is treated with 170 ml. of 40% formalin and 4 g. of sodium bicarbonate. Concentration of the solution in vacuo effects precipitation of the desired 5-ethyl-2-furyl α-succinamido-β-hydroxyethyl ketone which is collected, washed with water and recrystallized from ethyl acetate. This compound has the formula,

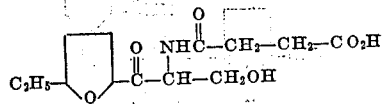

*Example 17*

91 g. of 5-ethyl-2-furyl cyanoacetamidomethyl ketone and 130 ml. of 40% formalin in 400 ml. of methanol are treated with 5 g. of sodium bicarbonate for one hour at room temperature. Dilution of the mixture with 2 volumes of water effects precipitation of the desired 5-ethyl-2-furyl α-cyanoacetamido-β-hydroxyethyl ketone. This material is collected and recrystallized from aqueous dioxane. The formula of this compound is,

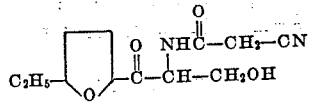

The 2-furyl acylamidomethyl ketones used as starting materials in the practice of the invention may be prepared by the method described in our co-pending application, No. 148,755, filed under even date herewith. Said method consists in simultaneously neutralizing and acylating an acid addition salt of the corresponding 2-furyl aminomethyl ketone. This process which can be diagrammatically depicted as follows:

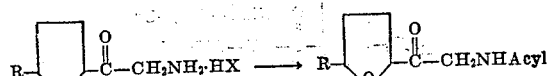

where X is an anion of a strong inorganic acid and R has the same significance as given above; is carried out by reacting the acid addition salt of the 2-furyl aminomethyl ketone with an acylating in the presence of a basic catalyst which will decompose in situ the stable acid addition salt of the amino ketone.

The following examples serve to illustrate the application of this general method to the preparation of some of the specific starting materials used in the foregoing examples.

*a.* 37.4 g. of 5-nitro-2-furyl aminomethyl ketone hydrochloride and 30 g. of sodium acetate are added to about 100 ml. of bis-dichloroacetic anhydride. The solution is stirred at 40–50° C. for one hour. Upon stirring into water, the solid 5-nitro-2-furyl dichloroacetamidomethyl ketone separates, and is recrystallized from aqueous alcohol. This compound has the formula,

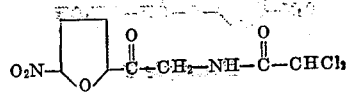

*b.* 150 g. of 5-nitro-2-furyl aminomethyl ketone hydrochloride is dissolved in a mixture composed of 1 liter of glacial acetic acid and 300 cc. of acetic anhydride. 85 g. of sodium acetate is added in small portions with stirring to the mixture and after the addition has been completed the solution is diluted with water. The insoluble 5-nitro-2-furyl acetamidomethyl ketone which separates from the solution is collected, washed with a small amount of water and dried. The formula of this product is,

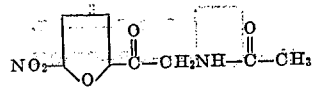

*c.* 50 g. of 2-furyl aminomethyl ketone hydrochloride is added to a mixture composed of 400 cc. of glacial acetic acid and 100 cc. of acetic anhydride. 40 g. of sodium acetate is added in small portions with stirring and after a few minutes the reaction mixture diluted with water. The insoluble 2-furyl acetamidomethyl ketone is collected, washed with water and dried. This product has the formula,

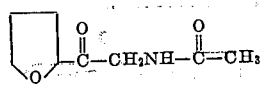

*d.* 55 g. of 5-methyl-2-furyl aminomethyl ketone hydrobromide is added to a mixture consisting of 70 g. of dry pyridine and 50 g. of phenyl acetyl chloride, keeping the temperature below about 5° C. After stirring for about one hour 1 liter of cold water is added and the precipitated product collected. The product thus obtained is 5-methyl-2-furyl phenylacetamidomethyl ketone of formula,

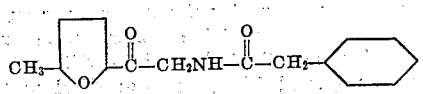

What we claim is:
1. A compound of formula,

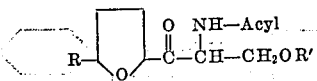

where R is a member of the class consisting of hydrogen, —NO₂, halogen and lower alkyl radicals and R' is a member of the class consisting of hydrogen and acyl radicals.

2. A compound of formula,

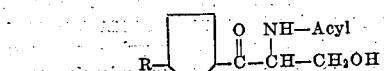

where R is a member of the class consisting of hydrogen,—NO₂, halogen, and lower alkyl radicals.

3. 2-furyl α-dichloroacetamido-β-hydroxyethyl ketone.

4. 5-nitro-2-furyl α-dichloroacetamido-β-hydroxyethyl ketone.

5. 5-nitro-2-furyl α-acetamido-β-hydroxyethyl ketone.

6. 5-nitro-2-furyl α-dichloroacetamido-β-acetoxyethyl ketone.

7. 2-furyl α-acetamido-β-acetoxyethyl ketone.

LOREN M. LONG.
NICKOLAS D. JENESEL.

No references cited.